US008449374B2

(12) United States Patent
Meyer et al.

(10) Patent No.: US 8,449,374 B2
(45) **Date of Patent: *May 28, 2013**

(54) MULTIPLIER FOR LOTTERY GAME

(75) Inventors: Mark G. Meyer, Cumming, GA (US); Charles Holton, Alpharetta, GA (US); Charles Martin Boykin, Alpharetta, GA (US); Steven Wayne Beason, Alpharetta, GA (US)

(73) Assignee: Scientific Games International, Inc., Newark, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/324,316

(22) Filed: Dec. 13, 2011

(65) Prior Publication Data

US 2012/0083326 A1 Apr. 5, 2012

Related U.S. Application Data

(63) Continuation of application No. 11/865,997, filed on Oct. 2, 2007, now Pat. No. 8,075,387.

(60) Provisional application No. 60/850,089, filed on Oct. 6, 2006.

(51) Int. Cl.
*A63F 9/24* (2006.01)
*A63F 13/00* (2006.01)

(52) U.S. Cl.
USPC .................... 463/18; 463/17; 463/25; 463/29

(58) Field of Classification Search
USPC ............................................................ 463/17
See application file for complete search history.

(56) References Cited

U.S. PATENT DOCUMENTS

| | | | |
|---|---|---|---|
| 5,157,602 | A | 10/1992 | Fields et al. |
| 5,407,199 | A | 4/1995 | Gumina |
| 5,451,052 | A | 9/1995 | Behm et al. |
| 5,613,679 | A | 3/1997 | Casa et al. |
| 5,788,237 | A | 8/1998 | Fults et al. |
| 5,855,514 | A | 1/1999 | Kamille |
| 6,416,408 | B2 | 7/2002 | Tracy et al. |
| 6,558,253 | B1 | 5/2003 | DeSimone et al. |
| 6,572,107 | B1 | 6/2003 | Walker et al. |
| 6,648,753 | B1 | 11/2003 | Tracy et al. |
| 6,692,354 | B2 | 2/2004 | Tracy et al. |
| 6,969,318 | B1 | 11/2005 | Packes, Jr. et al. |
| 7,018,292 | B2 | 3/2006 | Tracy et al. |
| 7,134,959 | B2 | 11/2006 | Penrice |

(Continued)

FOREIGN PATENT DOCUMENTS

| | | |
|---|---|---|
| WO | WO 2005/039711 | 5/2005 |
| WO | WO 2005/044410 | 5/2005 |

OTHER PUBLICATIONS www.oregonlottery.org—Oregon Lottery, Oregon's Game Megabucks.
Maryland State Lottery—Keno Bonus Animation.

(Continued)

*Primary Examiner* — Steven J Hylinski
(74) *Attorney, Agent, or Firm* — Dority & Manning, P.A.

(57) ABSTRACT

An improved multiplier for a lottery game is provided. In connection with a base lottery game, each player receives or selects a multiplier indicia (or other bonus indicia) from a pool of multiplier indicia. In addition to drawings for the base game, a drawing of multiplier indicia and a determination of associated multiplier values is also conducted. For those players winning the base game who also received a multiplier indicia matching the drawn multiplier indicia, the base game prize is multiplied by the associated multiplier value.

16 Claims, 3 Drawing Sheets

U.S. PATENT DOCUMENTS

| | | | |
|---|---|---|---|
| 7,383,037 | B2 | 6/2008 | Grossman et al. |
| 7,470,186 | B2 | 12/2008 | Cannon |
| 7,510,116 | B2 | 3/2009 | Robb et al. |
| 7,513,825 | B2 | 4/2009 | Packes et al. |
| 7,641,548 | B2 | 1/2010 | Packes et al. |
| 7,674,171 | B2 | 3/2010 | Walker et al. |
| 7,744,453 | B2 | 6/2010 | Pacey |
| 2002/0109294 | A1 | 8/2002 | Gauthier et al. |
| 2002/0169019 | A1 | 11/2002 | Walker et al. |
| 2004/0053657 | A1 | 3/2004 | Fiden et al. |
| 2004/0116176 | A1 | 6/2004 | Tulley et al. |
| 2004/0266514 | A1 | 12/2004 | Penrice |
| 2005/0014551 | A1 | 1/2005 | Packes et al. |
| 2005/0014552 | A1 | 1/2005 | Packes et al. |
| 2006/0017224 | A1 | 1/2006 | Seidman et al. |
| 2006/0030394 | A1 | 2/2006 | Crivelli |
| 2006/0151943 | A1 | 7/2006 | Bozeman |
| 2006/0205476 | A1 | 9/2006 | Jubinville |
| 2006/0208419 | A1 | 9/2006 | Katz et al. |
| 2006/0217181 | A1 | 9/2006 | Jubinville |
| 2006/0246995 | A1 | 11/2006 | Packes et al. |
| 2006/0246997 | A1 | 11/2006 | Packes et al. |
| 2006/0249897 | A1 | 11/2006 | Jubinville et al. |
| 2007/0066382 | A1 | 3/2007 | Penrice |
| 2007/0099689 | A1 | 5/2007 | Penrice |
| 2007/0135198 | A1 | 6/2007 | Costello et al. |
| 2009/0239605 | A1 | 9/2009 | Ekisheva et al. |

OTHER PUBLICATIONS

Article—Georgia Powerball, Confusion or Cash Awaits Game Players, The Atlanta Journal and the Atlanta Constitution, Sep. 2, 1995.

Article—Powerball Winners Could Double Prizes, Catoosa County News, Sep. 6, 1995.

International Search Report and Written Opinion for PCT/US2007/080244; May 14, 2008.

MULTIPLIER FOR LOTTERY GAME

PRIORITY CLAIM

The present application is a Continuation Application of U.S. application Ser. No. 11/865,997, filed Oct. 2, 2007, which claims the filing benefit of U.S. provisional patent application Ser. No. 60/850,089 filed on Oct. 6, 2006.

BACKGROUND OF THE INVENTION

Lottery games have become a method of raising revenue for state and federal governments the world over. Traditional scratch-off and on-line games have evolved over decades, supplying increasing revenue year after year. To increase interest and participation, some lottery games provide players a bonus in the form of a multiplier that can be applied to prizes won in the base lottery game. An additional game or drawing determines the multiplier, if any, to be applied to prizes won in the base lottery game. If the multiplier was awarded, all players participating in the multiplier portion of the game who also won the base game would have the same multiplier applied to their base game prizes, i.e., players, although winning different amounts in the base game, share the same multiplier value as a group. The present invention provides for different multiplier values to be assigned to various players of a base game and allows for weighting of such multiplier values as desired.

SUMMARY OF THE INVENTION

Objects and advantages of the invention will be set forth in part in the following description, or may be apparent from the description, or may be learned through practice of the invention. The present invention provides an improved multiplier for a lottery game. In one exemplary form of the present invention, a method of conducting a lottery game is provided. From a defined set of indicia, players are allowed to select a predetermined number of player indicia. Players are also provided with player multiplier indicia selected from a defined pool of multiplier indicia. Two or more game indicia are drawn from the defined set of indicia. A game multiplier indicia is also drawn from the defined pool of multiplier indicia. A prize is awarded to each player matching two or more of the player indicia with the game indicia. For each player having player multiplier indicia identical to the game multiplier indicia drawn, any prize amount won by matching player indicia with the game indicia from the base game drawing is multiplied by a value associated with the game multiplier indicia.

Several variations exist for this exemplary form of the present invention. Player multiplier indicia may be randomly assigned by the game administrator, e.g. a lottery provider, according to a defined probability distribution on the pool of multiplier indicia, or players may be allowed to select player multiplier indicia from the pool of multiplier indicia. The pool of multiplier indicia may consist of multiplier values, e.g. the integers 2, 3, 4, 5 and 10 or, alternatively, may consist of various alphanumeric characters or symbols. The set of indicia from which players select player indicia may include various alphanumeric characters such as the integers in the range of 1 to 35. However, numerous other symbols and ranges may be used for the set of indicia. In one form of the invention, players are allowed to select up to six player indicia, but other numbers of indicia may be used. Game prizes may increase as the number of selected player indicia matching the drawn game indicia increases.

In another exemplary form of the present invention, a lottery game method is included. In this exemplary method, players are provided with a predetermined number of player indicia where each such player indicia was selected by the player from a set of indicia. Each player is also assigned a player bonus indicia, selected from a pool of bonus indicia, that corresponds to the predetermined number of player indicia selected by the player. A predetermined number of game indicia are drawn from the set of indicia. A game bonus indicia is drawn from the pool of bonus indicia. A prize is awarded to the player if the selected player indicia match two or more of the game indicia drawn. If such a prize is awarded, a bonus prize is also awarded to the player if the player bonus indicia matches the game bonus indicia. Variations similar to that previously described may also be applied.

In another exemplary embodiment of the present invention, a lottery game ticket is provided. The ticket includes a substrate, a player indicia area, a player multiplier indicia area, a plurality of indicia selected by a player and printed upon the substrate in the player indicia area, and a player multiplier indicia randomly selected by a lottery provider from a pool of multiplier indicia and printed upon the substrate in the multiplier indicia area. The player multiplier indicia may be randomly selected according to a probability distribution on the pool of multiplier indicia, so that some multiplier indicia may be selected as the player multiplier indicia more frequently than other multiplier indicia. Variations similar to the previously described may also be applied.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
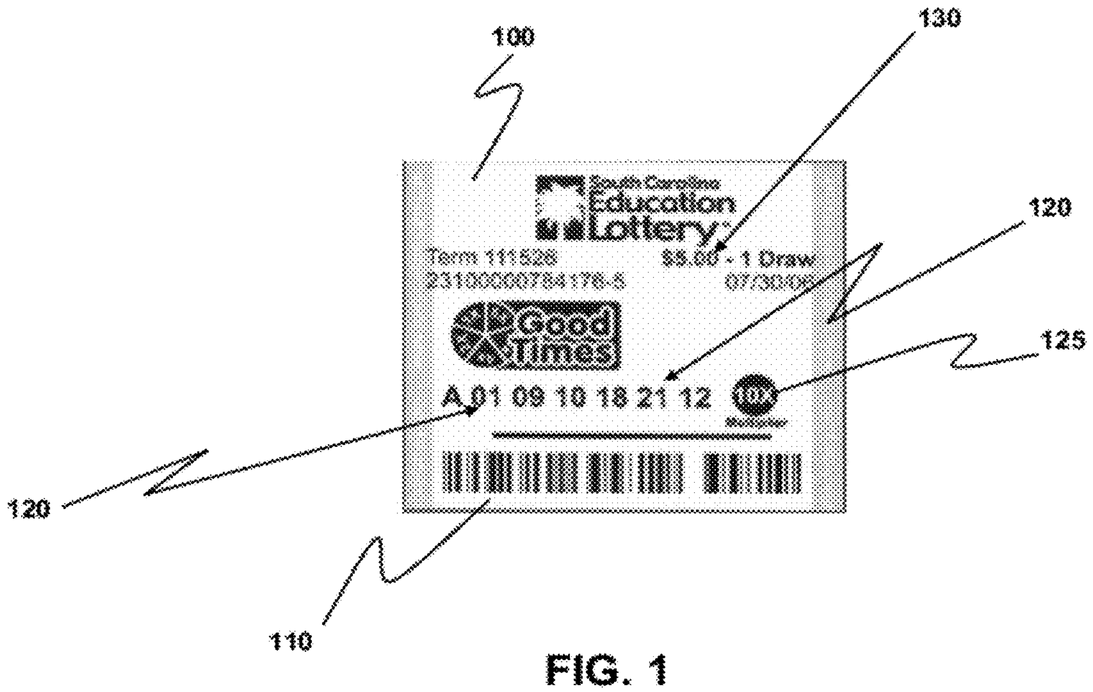
FIG. 1 is an exemplary embodiment of a lottery ticket as may be used with the present invention.

Objects and advantages of the invention will be set forth in the following description, or may be apparent from the description, or may be learned through practice of the invention. Repeat use of reference characters throughout the present specification and appended drawings is intended to represent same or analogous features or elements of the invention.

The present invention includes an improved multiplier for a lottery game. FIG. 1 provides an exemplary embodiment of a lottery ticket 100 according to the present invention. Ticket 100 includes a substrate 110 onto which a plurality of player indicia 120 have been printed. Each indicia 120 has been selected by the player and printed onto ticket 100 at the time of purchase. Alternatively, ticket 100 might be a virtual ticket bearing the same indicia as described herein for substrate 110. For this embodiment, the player has been allowed to select a predetermined number of six player indicia 120 from the set of indicia that includes integers 1 through 35. Ticket 100 also bears a player multiplier indicia (or bonus indicia) 125 with value 10×. The player multiplier indicia 125 was randomly assigned to lottery ticket 100 by the lottery provider at the time of purchase.

Subsequent to the purchase of lottery ticket 100, the lottery provider conducts a drawing of game indicia out of the same set of indicia the player used for selecting player indicia 120. This set of indicia for ticket 100 includes the integers 1 through 35. In this exemplary embodiment, the lottery provider conducts a drawing of up to six game indicia. If the player indicia 120 selected by the player includes two or more indicia 120 that match with the game indicia drawn by the lottery provider, the player wins a prize. The amount of the prize increases based on the number of indicia 120 that the player is able to match with the game indicia drawn by lottery provider. By way of example, for a purchase price 130 of $5, prizes might be structured as follows: $5 for two matches, $15 for three matches, $50 for four matches, $1,000 for 5 matches, and $50,000 if all six player indicia 120 match the game indicia drawn by the lottery provider.

In a further aspect of the invention, the lottery provider also conducts a drawing for a game multiplier indicia. For example, from a multiplier pool that includes multipliers of 2×, 3×, 4×, 5×, and 10×, the lottery provider conducts a random drawing of one multiplier. If the player multiplier indicia 125 on ticket 100 matches the game multiplier indicia drawn by the lottery provider, the player's prize for matching two or more player indicia 120 with the game indicia drawn by the lottery provider is increased by the amount of the multiplier 125. If, for example, the player of ticket 100 had matched four of the player indicia 120 with four game indicia, then the prize of $50 would be multiplied by the value of the player multiplier indicia 125. In the case of ticket 100, this would result in a ten-fold increase to $500. Regardless, while each multiplier indicia is not necessarily drawn as part of the game, each ticket 100 includes a multiplier indicia, and as such, each player participates in the drawing for a game multiplier. However, players with different multiplier indicia have chances of winning different multiplier values and do not necessarily win or lose as a single group.

Figure 2:
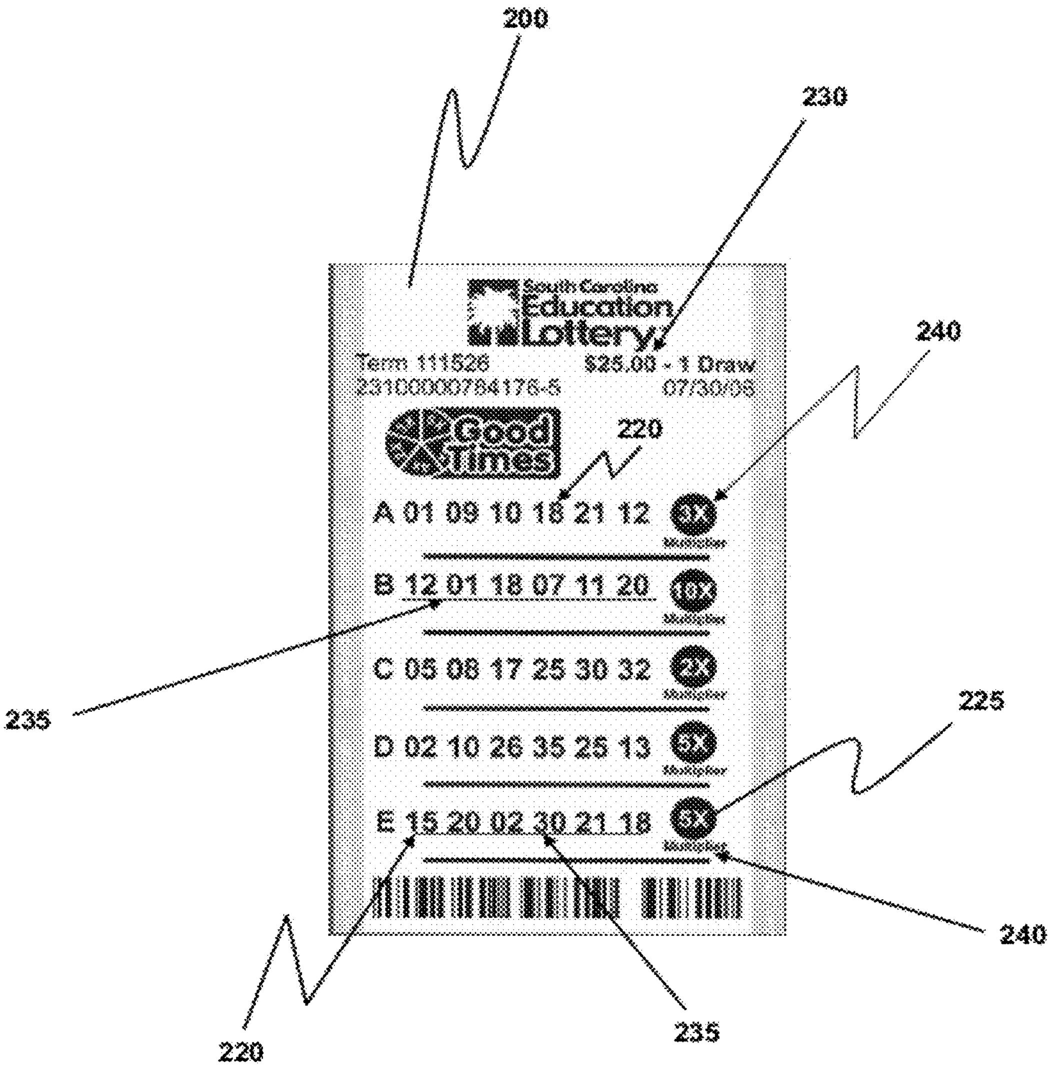
FIG. 2 is another exemplary embodiment of a lottery ticket as may be used with the present invention.

FIG. 2 illustrates another exemplary embodiment of a ticket 200 that may be used with the present invention. Ticket 200 is played in a manner similar to that which is described with regard to ticket 100. However, with ticket 200, five times (rows A through E) the player has picked six player indicia 220, which are printed on ticket 200 in the player indicia areas 235. Each of the five rows of player indicia 220 has also been randomly assigned a player multiplier indicia 225 (printed in the multiplier indicia area 240 of each row A through E) that applies to the six player indicia along a respective row. Accordingly, as compared to the one opportunity along row A of ticket 100, ticket 200 provides the player with five opportunities in rows A through E to win by matching two or more player indicia with the game indicia drawn by the lottery provider. In addition, the player has a chance to also multiply any such win along one or more of rows A through E by the value of the corresponding player multiplier indicia 225 if such matches with the game multiplier indicia drawn by the lottery provider.

Figure 3:
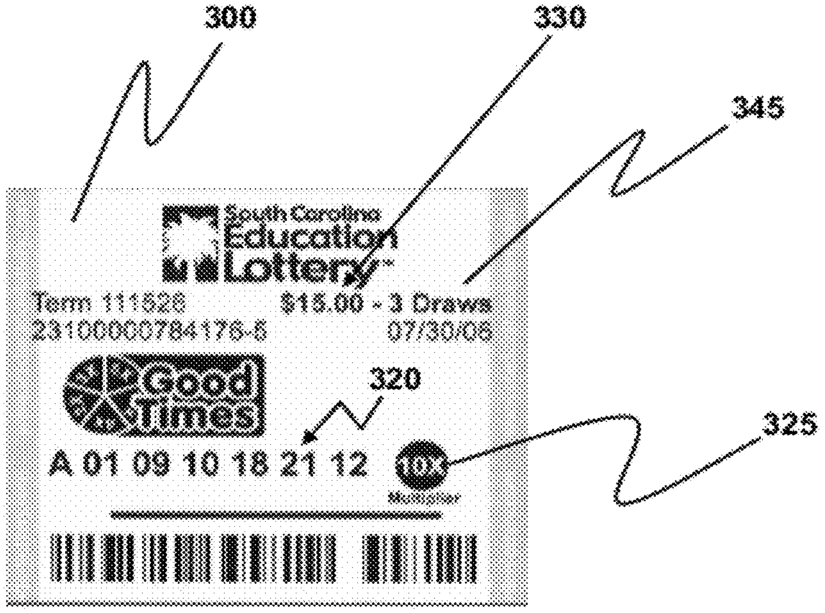
FIG. 3 is another exemplary embodiment of a lottery ticket as may be used with the present invention.

Ticket 300 shown in FIG. 3 is played in a manner previously described with reference to ticket 100. However, based on price 330, ticket 300 may be played in three different lottery drawings conducted by the lottery provider. More specifically, the lottery provider may conduct a drawing of six or more game indicia on three separate occasions. A player uses ticket 300 in an attempt to match two or more player indicia 320 with the game indicia drawn on each such occasion. Any win in any of the three lottery drawings is multiplied by the value of the multiplier 325 as previously described.

For the exemplary embodiments of FIGS. 1 through 3, player indicia 120, 220, and 320 were selected from the set of indicia including integers 1 through 35. However, numerous other indicia and ranges may be used including different numbers, letters, and/or symbols other than alphanumeric characters. In addition, a different number of player indicia may be used. For example, tickets 100, 200, and 300 each use six play indicia 120, 220, and 320 per row of player indicia area. Different numbers of indicia such as one or seven may be used, it being understood that the odds of such games can change with the number of player indicia used. In addition, the lottery provider may conduct a drawing of up to the same number of player indicia 120, 220, or 320 provided per ticket (six for these exemplary embodiments) or may choose to draw a different number of indicia to change the winning odds for the players.

As previously described, tickets 100, 200, and 300 were each randomly assigned a player multiplier indicia 125, 225, or 325 at, for example, the time of purchase of the lottery ticket. In another variation of the invention, however, a player may be allowed to purchase a multiplier of choice. For example, a player might select a single preferred multiplier value from the pool of available multiplier values or might select all such multipliers. Where only a single multiplier is drawn by the lottery provider, by purchasing all multipliers that player ensures that any win receives the benefit of at least one of the multipliers. In another variation of the invention, the lottery provider might choose to draw more than one multiplier. While the previous exemplary embodiments have been described using multipliers selected from the group that includes 2×, 3×, 4×, 5×, and 10×, it should be understood that numerous other multiplier values may be used.

In embodiments in which player multiplier indicia are randomly assigned to base game tickets, each multiplier value may have the same probability of being assigned to a particular base game play (ticket). Alternatively, the frequencies of appearance of the different multiplier values may be weighted such that some values have higher probabilities of being assigned than others. For example, the pool of multiplier values might be weighted so that forty percent of the multiplier values assigned at the point of sale of the ticket are 3×, thirty percent are 4×, twenty percent are 5×, and ten percent are 10×. Once the pool of multiplier values has been weighted, then the weighted multiplier values from within that pool are randomly assigned to each ticket as such are purchased, for example. In an alternative embodiment, the multiplier values could be assigned on a weighted "nth" ticket basis or in a prescribed sequential (i.e. metered) fashion. For example, a repeating sequence of 2×, 3×, 4×, 5×, and 10× (or some other pattern) could be followed as tickets are purchased. A distribution system could be used to randomize the appearance of any such sequence from the standpoint of the consumers. Still further methods and systems may be used for distributing the multipliers as is described in U.S. Pat. No. 7,018,292, the entire contents of which are hereby incorporated by reference.

The drawing for the game multiplier indicia will correspond to a base game drawing. This multiplier drawing may be conducted either before or after the base game drawing. The drawing may be conducted using real or virtual spinning wheels, mechanical drawing machines, or by other methods known in the art. Each multiplier in the pool of multipliers could have an equal probability of being selected during the drawing. Alternatively, the game multiplier itself could be drawn randomly according to a probability distribution on the pool of multipliers. For example, a spinning wheel where some multipliers appear more times than others might be used.

In another variation of the present invention, the opportunity to participate in the drawing of a game multiplier indicia may be embedded or optional. For example, a player multiplier indicia may be automatically added to ticket 100, 200, or 300. Alternatively, the player may be allowed to option out of the drawing for a game multiplier indicia to purchase a less expensive ticket.

Finally, the present invention has been described with regard to a lottery type base game in which a player selects six numbers and compares the same to a subsequent lottery draw. A winning multiplier is then applied to any win created by the underlying base game. It should be understood, using the teachings disclosed herein, that the drawing of a multiplier as described herein could be applied to a variety of other base games. As such, using base games with various winning odds in combination with a drawing for a game multiplier indicia with weightings as previously described, the present invention allows a lottery provider to control overall payout to assure profitability while also providing the ability determine the odds of winning, increase the number of prize tiers for any base game, and set ticket prices based on the same.

While the present subject matter has been described in detail with respect to specific embodiments and methods thereof, it will be appreciated that those skilled in the art, upon attaining an understanding of the foregoing may readily produce alterations to, variations of, and equivalents to such embodiments and methods. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for conducting a lottery game via a lottery ticket and associated lottery drawing, comprising the steps of:

defining a set of indicia comprising alphanumeric characters or symbols for display on a lottery ticket;

defining a pool of multiplier indicia comprising alphanumeric characters or symbols, with each character or symbol having a known multiplier value assigned thereto;

allowing players to select a predetermined number of player indicia from said set of indicia;

displaying the selected player indicia on a printed lottery ticket or virtual lottery ticket;

wherein the multipliers are assigned to the player selected indicia such that when more than one multiplier is assigned, the assigned multipliers are assigned to the player selected indicia as a group, and when all available player multiplier indicia are assigned this guarantees matching a randomly selected game multiplier with one of the assigned multipliers;

displaying the selected at least one multiplier indicia on the printed lottery ticket or virtual lottery ticket;

conducting a drawing where two or more game indicia from said set of indicia are randomly selected and made known to the players;

as part of the drawing, randomly selecting a game multiplier indicia from said pool of multiplier indicia and making the selection known to the players;

as a result of the drawing, awarding a prize to each player matching two or more of said player indicia displayed on the printed lottery ticket or virtual lottery ticket with said game indicia; and multiplying said prize by said game multiplier value for each player having player multiplier indicia displayed on the printed lottery ticket or virtual lottery ticket matching said game multiplier indicia wherein the amount of the prize is increased as a result of matching the game multiplier indicia selected during the drawing.

2. A method for conducting a lottery game as in claim 1, wherein said game multiplier indicia is drawn from said pool of multiplier indicia randomly according to a defined probability distribution on said pool of multiplier indicia such that certain game multiplier indicia have higher probabilities of random selection than others.

3. A method for conducting a lottery game as in claim 1, wherein said pool of multiplier indicia comprises the integers 2, 3, 4, 5 and 10.

4. A method for conducting a lottery game is in claim 1, wherein said prize increases in amount as the number of said player indicia matching said game indicia increases for each said player.

5. The method for conducting a lottery game as described in claim 1, wherein at least one player multiplier indicia is automatically added to the ticket.

6. The method of conducting a lottery game as described in claim 5, wherein the player may opt out of the at least one player multiplier indicia being automatically added to the ticket.

7. The method of conducting a lottery game as described in claim 6, wherein opting out of the at least one player multiplier indicia being automatically added to the ticket reduces the price of the ticket.

8. A lottery game method conducted via a printed or virtual lottery ticket and a lottery drawing, comprising the steps of:

providing a player with a predetermined number of player indicia comprising alphanumeric characters or symbols, wherein each said player indicia was selected by the player or randomly generated for the player from a set of indicia;

displaying the player indicia on a printed lottery ticket or virtual ticket;

assigning a player bonus indicia to said predetermined number of player indicia, wherein said player bonus indicia was selected by the player or selected for the player from a pool of bonus indicia wherein the player selects how many player bonus indicia are assigned and when more than one bonus indicia is assigned, all assigned bonus indicia are assigned to the player indicia as a group and assigning all available player bonus indicia guarantees matching a randomly selected game bonus indicia with one of the assigned bonus indicia;

displaying the selected player bonus indicia on the printed lottery ticket or virtual ticket;

conducting a drawing wherein a predetermined number of game indicia are selected from said set of indicia;

during the drawing, randomly selecting a game bonus indicia from said pool of bonus indicia according to a defined probability distribution on said pool of bonus indicia such that certain game bonus indicia have higher probabilities of random selection than others;

awarding a prize during the drawing to said player if said player indicia match two or more of said game indicia; and awarding a bonus to said player as a result of the drawing if said player bonus indicia displayed on the printed lottery ticket or virtual lottery ticket matches said game bonus indicia and if said player indicia matched two or more of said game indicia wherein the amount of the prize is only increased as a result of matching the player bonus indicia selected during the drawing.

9. A lottery game method as in claim 8, wherein players select the player bonus indicia from said pool of bonus indicia.

10. A lottery game method as in claim 8, wherein the player bonus indicia is randomly selected for the player from said pool of bonus indicia having a plurality of weighted multipliers such that certain of the multipliers have higher probabilities of random selection than others.

11. A lottery game method as in claim 8, wherein said prize increases as the number of player indicia matching said game indicia increases.

12. A lottery game method as in claim 8, wherein said set of indicia comprises alphanumeric characters.

13. The method of conducting a lottery game as described in claim 8, wherein at least one player bonus indicia is automatically added to the ticket.

14. The method of conducting a lottery game as described in claim 13, wherein the player may opt out of the at least one player bonus indicia being automatically added to the ticket.

15. The method of conducting a lottery game as described in claim 14, wherein the player opting out of the at least one player bonus indicia being automatically added to the ticket reduces the price of the ticket.

16. A lottery game ticket, comprising:

a substrate;

a player indicia area;

a player multiplier indicia area;

a plurality of indicia selected by a player and printed upon said substrate in said player indicia area;

a player multiplier indicia randomly selected by a lottery provider from a weighted pool of multiplier indicia and printed upon said substrate in said multiplier indicia area wherein the frequency of the appearance of the player multiplier indicia is influenced so that some player multiplier indicia have higher probabilities of selection than others wherein the player selects how many player multiplier indicia are provided and when the multiplier is assigned to the plurality of indicia selected by the player such that when more than one multiplier is assigned, the multipliers are assigned to the plurality of indicia selected by the player as a group, and assigning all available player multiplier indicia guarantees matching a randomly selected game multiplier with one of the assigned multipliers; and wherein the amount of the prize is only increased as a result of matching the game multiplier indicia selected during the drawing.

* * * * *